April 15, 1941.          S. M. BURKA ET AL          2,238,032
                         DIRECT READING SEXTANT
                          Filed April 5, 1939
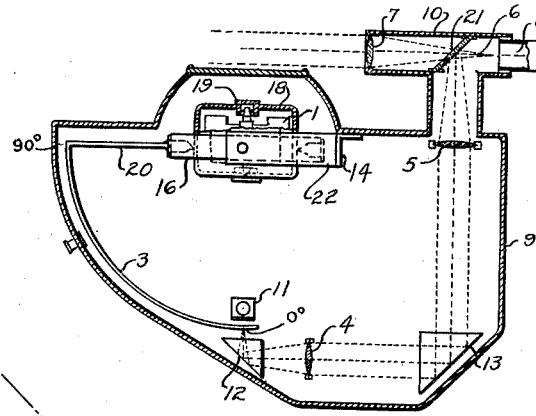
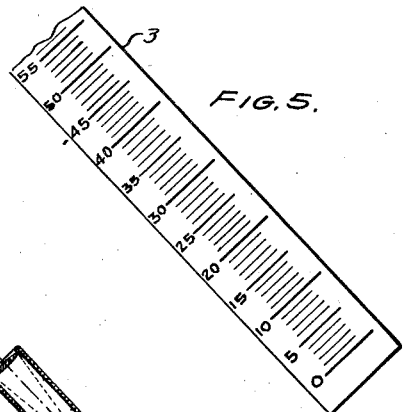
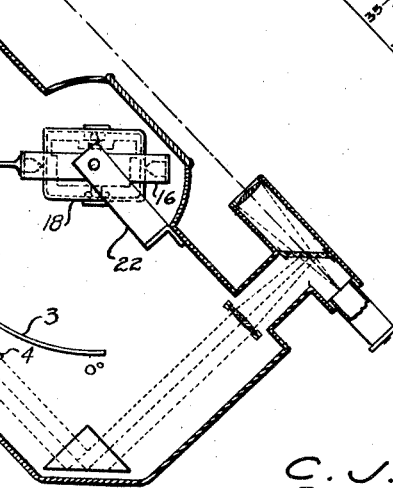
INVENTORS
C. J. CRANE
S. M. BURKA
BY Edgar H. Snodgrass
   and
   Wade Kornitz
                ATTORNEYS Patented Apr. 15, 1941

2,238,032

UNITED STATES PATENT OFFICE 2,238,032

DIRECT READING SEXTANT

Samuel M. Burka, Dayton, Ohio, and Carl J. Crane, Montgomery, Ala.

Application April 5, 1939, Serial No. 266,092

4 Claims. (Cl. 88—2.2)

(Granted under the act of March 3, 1883, as amended April 30, 1928; 370 O. G. 757)

The invention described herein may be manufactured and used by or for the Government for governmental purposes, without the payment to us of any royalty thereon.

This device consists of a sextant by means of which an object or celestial body may be directly observed and its altitude directly read on a gyroscopically stabilized scale.

It is an object of this invention to provide a direct reading precession-free altitude measuring instrument.

It is another object of this invention to provide in an altitude-measuring instrument, mechanism for establishing an artificial horizon, an altitude scale carried by the artificial horizon mechanism and relatively tiltable with respect to the instrument, and an optical system for transmitting into the field of view of the telescope, indicia corresponding to the tilt of the instrument.

In the drawing,

Figure 1 is a rear elevational view of the sextant looking from the right in Figure 2;

Figure 2 is a cross sectional view along the line 2—2 of Figure 1 with the sextant in the horizontal position and showing some of the parts in elevation;

Figure 3 is a view similar to Figure 2 with the instrument in position to observe a celestial body;

Figure 4 is a plan view of the gimbal mounting of the gyroscopically stabilized scale taken along the line 4—4 of Figure 2; and Figure 5 is a plan view of the scale.

The sextant is composed of a casing 9, carrying a telescope housing 10 and a pivotally mounted gyroscopically stabilized scale 3. The telescope has an objective lens 7, glass 21, adapted to transmit and reflect images, and eyepiece 8. The altitude of an observed body is measured on scale 3, a portion of which is imaged at 6 by means of a prism 12, lens 4, prism 13, lens 5, and reflecting glass 21. Scale 3 is transparent and is illuminated by light 11, conventionally connected to a suitable source of electrical energy by wires and a switch. Also a lock or latch of conventional construction (not shown) may be provided for holding scale 3 in inoperative position.

Scale 3 is mounted in casing 9 and gyroscopically stabilized by means of gimbal ring 16, pivotally supported by bearings 2 carried by a yoke 22 which in turn is fastened to casing 9 by member 14. Pivotally mounted on bearings 15 is the gimbal ring 18, constituting a housing for the gyro rotor 1 mounted on suitable bearings 19 to spin about a vertical axis for stabilizing housing 18. The gyro rotor is preferably of the self-erecting type of conventional construction and may be driven electrically or by compressed air. It is to be understood that suitable connections are provided to operate the gyro rotor. These are not shown because of their conventional nature.

The scale is graduated to read zero degrees when the telescope is horizontal and ninety degrees when the telescope is vertical. Lenses 4, 5 and 7 are so chosen with relation to the radius of rotation of the scale 3 that the scale reading imaged at 6 corresponds to the altitude of the observed body and, as the sextant is tilted, both the observed image and scale image will move together across the telescope field. To obtain this result the equivalent focal length of combined lenses 4 and 5 is made equal to the radius of rotation of scale 3. This results in a direct reading instrument and enables the observer to directly read the altitude of any body in the telescope field for the following reasons:

An image of a heavenly body observed through lens 7 at a point other than the center of the lens will be observed in eyepiece 8 a distance from the focal point 6 corresponding to the position of the image in the lens 7. Since indicia representing a portion of the scale 3 is reflected into the line of sight of the eyepiece 8, it follows that an image of an object observed anywhere in the field of the lens 7 will coincide with indicia on the image of the scale 3. Also, since the radius of tilt of scale 3 is equal to the effective focal length of the combined lenses 4 and 5, tilting of the sextant about a transverse horizontal axis will not affect the relative positions of the observed object and the indication of its position on scale 3. In other words, as long as the observed object is viewable in the telescope, its image will remain in coincidence with its reading on the reflected indica of scale 3.

In the operation of the device the observer tilts the casing until the telescope points generally in the direction of the celestial body, or object whose altitude it is desired to measure. The gyro rotor is released from its locked or latched position and caused to spin by electrical or compressed air mechanism (not shown). The object is observed in the telescope field and the graduation of the imaged scale with which it coincides is read. It is readily appreciated that it is not necessary to have cross-hairs in the telescope because, from the relationship of parts, the coincidence of images of a scale graduation and an observed body anywhere in the field of view of the telescope is a measure of altitude of the body. It is also readily appreciated that the altitude of several bodies in the field of the telescope may be read at once, if desired, since the graduation of the scale image with which each coincides is a measure of the altitude of each body.

It is obvious that the invention may be practiced in many different forms and it is intended to be limited only by the scope of the appended claims.

We claim:

1. A sextant comprising a casing; a telescope mounted on said casing for directly observing an object, the altitude of which it is desired to measure; a gyroscopically stabilized arcuate scale mounted in said casing to tilt about a transverse horizontal axis; and lens means for transmitting an image of said scale into the line of sight of said telescope; said lens means having an equivalent focal length equal to the tilting radius of said scale, said image when transmitted having the same orientation as the observed object, whereby said image and scale maintain their relative position in the field.

2. A sextant comprising a casing, a telescope mounted on said casing for directly observing a body; a scale; an optical system for transmitting an image of said scale into the field of view of said telescope with the same orientation as the observed body, said scale being graduated and so arranged in said casing as to read from zero degrees when the telescope is horizontal, to ninety degrees when the telescope is vertical; gyroscopically stabilized means for mounting said scale for relative tilting movement about a horizontal axis transverse to the longitudinal axis of the telescope, said means comprising a gimbal ring carrying said scale and mounted on said casing to rotate about an axis transverse to the longitudinal axis of said telescope; a rotor-carrying member mounted in said gimbal ring to rotate about a longitudinal horizontal axis; and a gyro rotor mounted on said member to spin about a vertical axis.

3. A sextant comprising a framework, a telescope carried by said framework for observing a body, a scale tiltably mounted on said framework, means for gyroscopically stabilizing said scale, and lens means for transmitting an image of said scale into the line of sight of said telescope with the same orientation as the observed object, the radius of tilting of said scale being the same as the equivalent focal length of said lens means whereby coincidence of an image of a body observed through said telescope and indicia on said scale is a measure of the altitude of said body.

4. In an apparatus for measuring the altitude of an observed body, a telescope for observing a body, Cardanic suspension means carried by said apparatus, a gyro-rotor supported by said Cardanic suspension means, a scale carried by a part of said Cardanic suspension means for pivotal movement relative to said telescope in a longitudinal vertical plane through the line of sight of said telescope and stabilized by said gyro-rotor, and an optical system for transmitting an image of said scale into the line of sight of said telescope with the same orientation as the observed object, the radius of pivotation of said scale and the equivalent focal length of said optican system being the same length whereby the altitude of an observed body may be directly read by coincidence of an image of the scale with the image of the observed body.

SAMUEL M. BURKA.
CARL J. CRANE.